US010467723B2

United States Patent
Johnson et al.

(10) Patent No.: US 10,467,723 B2
(45) Date of Patent: Nov. 5, 2019

(54) TILE-BASED CHECK VALUES FOR DATA CONTENT INTEGRITY IN A GPU SUBSYSTEM

(71) Applicant: QUALCOMM Incorporated, San Diego, CA (US)

(72) Inventors: Brendon Lewis Johnson, San Diego, CA (US); Andrew Evan Gruber, Arlington, MA (US); Jay Chunsup Yun, Carlsbad, CA (US); Rahul Gulati, San Diego, CA (US); Donghyun Kim, San Diego, CA (US); Alex Kwang Ho Jong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 15/850,907

(22) Filed: Dec. 21, 2017

(65) Prior Publication Data

US 2019/0197651 A1    Jun. 27, 2019

(51) Int. Cl.
*G09G 5/00* (2006.01)
*G06T 1/20* (2006.01)
(Continued)

(52) U.S. Cl.
CPC ............ *G06T 1/20* (2013.01); *G06F 11/1004* (2013.01); *G06T 1/60* (2013.01); *G06T 7/001* (2013.01); *G09G 5/363* (2013.01); *B60K 35/00* (2013.01); *B60K 2370/21* (2019.05); *B60R 1/00* (2013.01); *B60R 2300/30* (2013.01); *G06T 2207/30108* (2013.01); *G09G 2330/08* (2013.01);
(Continued)

(58) Field of Classification Search
CPC ...... G06T 2207/20021; G09G 2330/12; G09G 2380/10; G09G 2380/12; G09G 5/363; G06F 11/00; G06F 11/0739; G06F 11/1004
See application file for complete search history.

(56) References Cited

U.S. PATENT DOCUMENTS 8,933,934 B1   1/2015  Hill et al.
9,026,615 B1   5/2015  Sirton et al.
(Continued)

OTHER PUBLICATIONS

International Search Report and Written Opinion—PCT/US2018/062891—ISA/EPO—dated Mar. 14, 2019, 13 pp.

*Primary Examiner* — Hau H Nguyen
(74) *Attorney, Agent, or Firm* — Shumaker & Sieffert, P.A.

(57) ABSTRACT

A graphics processing unit (GPU) of a GPU subsystem of a computing device processes graphics data to produce a plurality of portions of a first image, and to produce a plurality of portions of a second image. The GPU generates a plurality of data integrity check values associated with the plurality of portions of the first image, and a plurality of data integrity check values associated with the plurality of portions of the second image. The GPU determines whether each of the plurality of portions of the second image matches a corresponding portion of the first image. The GPU determines, prior to producing every portion of the second image, whether an operational fault has occurred in the GPU subsystem based at least in part the determination of whether each of the plurality of portions of the second image matches a corresponding portion of the first image.

22 Claims, 5 Drawing Sheets

(51) Int. Cl.
  *G06T 1/60* (2006.01)
  *G06F 11/10* (2006.01)
  *G06T 7/00* (2017.01)
  *G09G 5/36* (2006.01)
  *B60R 1/00* (2006.01)
  *B60K 35/00* (2006.01)

(52) U.S. Cl.
  CPC ..... *G09G 2330/10* (2013.01); *G09G 2330/12* (2013.01); *G09G 2380/10* (2013.01); *G09G 2380/12* (2013.01)

(56) References Cited

U.S. PATENT DOCUMENTS

| | | |
|---|---|---|
| 9,836,808 B2 | 12/2017 | Krutsch et al. |
| 2016/0110837 A1* | 4/2016 | Sideris .................. G06T 11/40 345/522 |
| 2016/0212021 A1 | 7/2016 | Barry et al. |
| 2016/0379333 A1 | 12/2016 | Krutsch et al. |
| 2017/0185532 A1 | 6/2017 | Durham et al. |

\* cited by examiner

TILE-BASED CHECK VALUES FOR DATA CONTENT INTEGRITY IN A GPU SUBSYSTEM

TECHNICAL FIELD

The disclosure relates to the testing of a graphics processing unit (GPU) subsystem for safety critical applications.

BACKGROUND

Graphics processing units (GPUs) are processing circuits configured to perform many operations in parallel and are useful for graphics operations that generate image data for display. GPUs are used in a variety of environments including automobiles. For instance, a GPU generates image content, such as image content displayed on an instrument panel behind the steering wheel, image content used as warning indicators, image content related to infotainments screens, image content from a rearview camera, and other image content for other automotive display systems. A display device in an automobile may be part of, or operably coupled to, an automotive advanced driver assistance system (ADAS) such that the display device may also display blind spot warnings to alert the driver that there are vehicles situated at the driver's blind spot.

A safety critical ADAS may be required to fulfill functional safety requirements, such as those mandated by ISO 26262 (functional safety standard for road vehicles). One functional safety requirement is to ensure data content integrity for image data that are to be displayed by a display device. A failure to display correct image data may lead to a violation of defined safety goals for an automotive application. Example automotive applications that may use displays include a rear-view camera system, front collision warning systems, traffic sign recognition systems, parking assistance systems, instrument clusters, and the like.

SUMMARY

In general, aspects of the disclosure are directed to techniques for ensuring the data content integrity of a GPU subsystem. In certain applications, for example, if the GPU subsystem generates output data for an automotive advanced driver assistance system (ADAS) or a flight control system for controlling an aircraft, the integrity of the GPU subsystem may be especially important to maintaining the safety of the driver and passengers of the vehicle.

The GPU subsystem may perform graphics processing operations to render images to be displayed at a display device operably coupled to the ADAS or flight control system. Due to transient or permanent failures in the hardware of the GPU subsystem, the GPU subsystem may not necessarily generate correct output.

If the GPU subsystem introduces errors into images during such processing, then the user may not be able to rely on the accuracy of the images that are displayed by the display device. In the example of the display device that displays the video captured by the rear-view camera, the GPU subsystem may impact the safety of the driver and passengers, as well as pedestrians and occupants of other vehicles in a negative fashion if the GPU subsystem malfunctions.

In general, the techniques of this disclosure include performing the same graphics operation twice (e.g., an operation for rendering or generally producing an image) using a graphics processing unit (GPU) to produce two respective images. The GPU may generate a data integrity check value for each of a plurality of portions of each of the two images. The respective data integrity check values for corresponding portions of the two images may then be compared to determine whether the result of performing the same graphics operations are different (i.e., if one or more portions of a first image does not match a corresponding portion of a second image). If so, the computing device may identify an error in the GPU subsystem and issue a warning (e.g., an interrupt).

In one aspect, the disclosure is directed to a method for testing of a graphics processing unit (GPU) subsystem of a computing device. The method may include processing, by a GPU, graphics data to produce a plurality of portions of a first image. The method may further include generating, by the GPU, a plurality of data integrity check values associated with the plurality of portions of the first image, wherein each one of the plurality of data integrity check values is associated with a corresponding portion of the first image. The method may further include processing, by the GPU, the graphics data to produce a portion of a second image, wherein processing the graphics data to produce the portion of the second image includes producing fewer portions than every portion of the second image. The method may further include generating, by the GPU, a data integrity check value associated with the portion of the second image. The method may further include determining, by the GPU, whether the portion of the second image matches a corresponding one of the plurality of portions of the first image by comparing the data integrity check value associated with the portion of the second image with a corresponding one of the plurality of data integrity check values associated with the plurality of portions of the first image. The method may further include determining, by the GPU, whether an operational fault has occurred in the GPU subsystem based at least in part on the determination of whether the portion of the second image matches the corresponding one of the plurality of portions of the first image.

In another aspect, the disclosure is directed to an apparatus configured for graphics processing. the apparatus may include one or more memories. The apparatus may further include a GPU in communication with the one or memories via one or more buses, wherein a GPU subsystem comprises the one or more memories, the GPU, and the one or more buses, the GPU being configured to: process graphics data to produce a plurality of portions of a first image; generate a plurality of data integrity check values associated with the plurality of portions of the first image, wherein each one of the plurality of data integrity check values is associated with a corresponding portion of the first image; process the graphics data to produce a portion of a second image, wherein processing the graphics data to produce the portion of the second image includes producing fewer portions than every portion of the second image; generate a data integrity check value associated with the portion of the second image; determine whether the portion of the second image matches a corresponding one of the plurality of portions of the first image by comparing the data integrity check values associated with the portion of the second image with a corresponding one of the plurality of data integrity check values associated with the plurality of portions of the first image; and determine whether an operational fault has occurred in the GPU subsystem based at least in part on the determination of whether the portion of the second image matches the corresponding one of the plurality of portions of the first image.

In another aspect, the disclosure is directed to an apparatus configured for graphics processing. The apparatus may include means for processing graphics data to produce a plurality of portions of a first image. The apparatus may further include means for generating a plurality of data integrity check values associated with the plurality of portions of the first image, wherein each one of the plurality of data integrity check values is associated with a corresponding portion of the first image. The apparatus may further include means for processing the graphics data to produce a portion of a second image, wherein the means for processing the graphics data to produce the portion of the second image includes means for producing fewer portions than every portion of the second image. The apparatus may further include means for generating a data integrity check value associated with the portion of the second image. The apparatus may further include means for determining whether the portion of the second image matches a corresponding one of the plurality of portions of the first image, including means for comparing the data integrity check value associated with the portion of the second image with a corresponding one of the plurality of data integrity check values associated with the plurality of portions of the first image. The apparatus may further include means for determining whether an operational fault has occurred in the GPU subsystem based at least in part on the determination of whether the portion of the second image matches the corresponding one of the plurality of portions of the first image.

In another aspect, the disclosure is directed to a computer-readable storage medium storing instructions that, when executed, causes one or more processors to: process graphics data to produce a plurality of portions of a first image; generate a plurality of data integrity check values associated with the plurality of portions of the first image, wherein each one of the plurality of data integrity check values is associated with a corresponding portion of the first image; process the graphics data to produce a portion of a second image, wherein processing the graphics data to produce the portion of the second image includes producing fewer portions of the second image; generate a data integrity check value associated with the portion of the second image; determine whether the portion of the second image matches a corresponding one of the plurality of portions of the first image by comparing the plurality of data integrity check value associated with the portion of the second image with a corresponding one of the plurality of data integrity check values associated with the plurality of portions of the first image; and determine whether an operational fault has occurred in the GPU subsystem based at least in part the determination of whether the portion of the second image matches the corresponding one of the plurality of portions of the first image.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
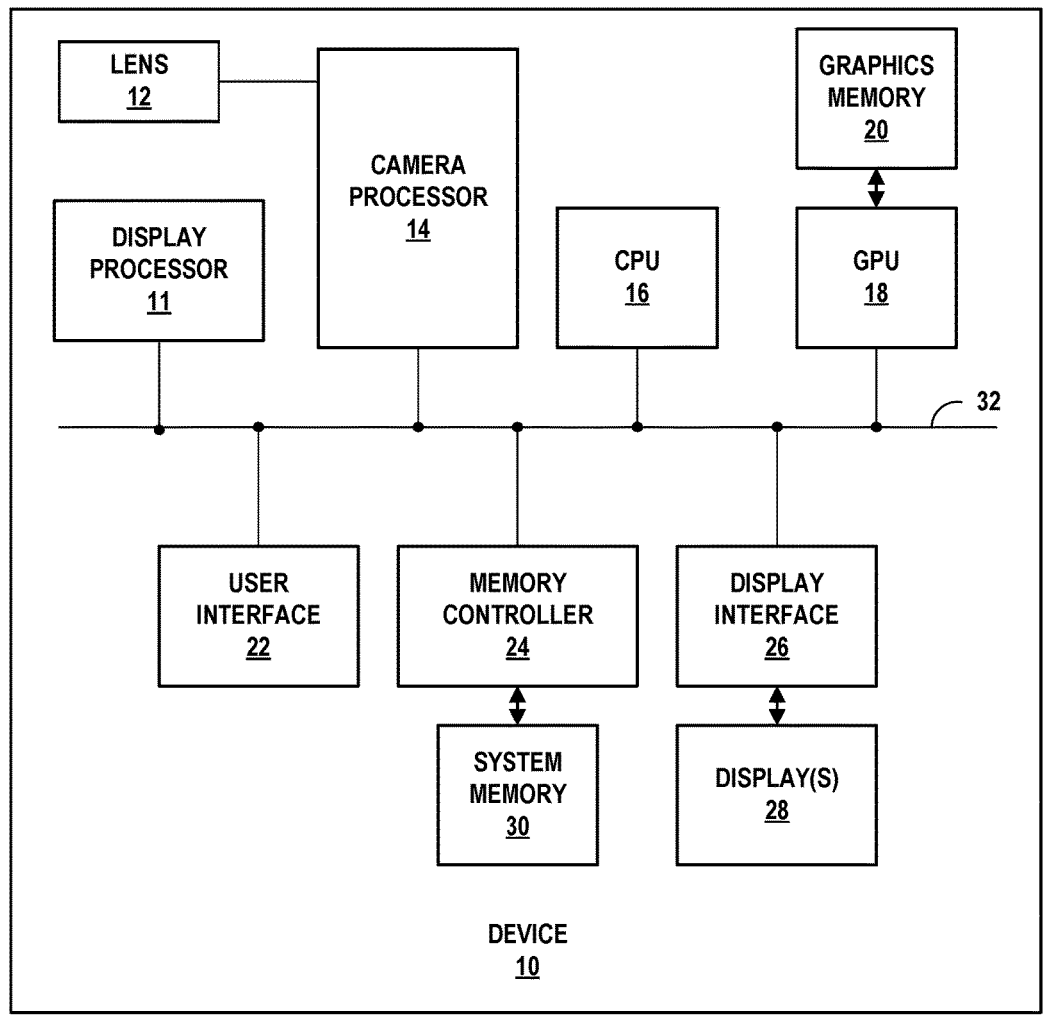
FIG. 1 is a block diagram illustrating an example computing device that may be configured to implement techniques of this disclosure.

Examples of this disclosure are directed to techniques, structures, and devices for ensuring the hardware, memory, and data content integrity of a GPU subsystem by detecting operational faults of the GPU subsystem using data integrity check values for portions of images produced by the GPU subsystem. The GPU of the GPU subsystem may perform the same graphics operation twice (e.g., an operation for rendering or generally producing an image) to render two images. The GPU may generate a data integrity check value for each portion of the two images. The computing device may compare the two images by comparing data integrity check values for corresponding portions of the two images, and may determine that a fault has occurred in the GPU subsystem if data integrity check values of corresponding portions of two images do not match. The techniques of this disclosure may have application in automotive display systems, avionics display systems, or any other GPU subsystem where it may be beneficial to ensure that the image data intended to be displayed is displayed.

A computing device configured to perform the techniques of this disclosure may perform concurrent and online testing of its GPU subsystem to detect operational faults using the diverse redundancy approach. Concurrent testing of the GPU subsystem is a continuous testing of the GPU subsystem while the computing device is powered on. Online testing of the GPU subsystem includes testing of the GPU subsystem while the computing device and the GPU subsystem are powered on and performing its normal functionality.

In other words, the computing device may perform testing of the GPU subsystem while the computing device is powered on and in use for its normal operations by a user without entering into a dedicated test mode that prevents the user from using the computing device, and without switching off a display device that is included in or otherwise operably coupled to the computing device. Thus, if the computing device is an ADAS that includes rear view camera functionality, the user of the ADAS may use the ADAS to view video streamed from a rear-view camera of the vehicle while ADAS performs concurrent and online testing of the GPU subsystem.

Such concurrent and online testing of the GPU subsystem may detect operational faults of the GPU subsystem, which may include the GPU subsystem incorrectly rendering graphics data. Operational faults may include permanent faults, intermittent faults, and transient faults. Permanent faults may be faults that remain in existence indefinitely if no corrective action is taken. Such faults may be residual design or manufacturing faults. Intermittent faults may appear, disappear, and reappear repeatedly. Such faults may be difficult to predict but their effects may be highly correlated. When such intermittent faults appear, the GPU subsystem may work correctly most of the time but may fail under atypical environmental conditions. Transient faults may appear and disappear quickly, and such faults may not be correlated. Such transient faults are often induced by random environmental disturbances.

The GPU subsystem may include buses, memories, processors, and other hardware components that are used when rendering graphics data, such as the GPU, system memory, graphics memory, buses that operably couple such hardware components, and the like. For example, a GPU may communicate with memory via buses in order to read and write data to and from memory during the course of rendering an image. The GPU, memory, and buses that are used during the course of rendering the image may make up at least a portion of the GPU subsystem.

Currently available GPU subsystems may face several challenges with respect to its use for functional safety critical applications. One challenge is that currently available GPU subsystems may not include error correcting code (ECC) memory or parity check mechanisms. ECC memory and parity check mechanisms may be relatively expensive compared with non-ECC memory. Further, ECC memory may have a relatively larger physical size compared with non-ECC memory. As such, ECC memory may not be optimized for computing devices where the cost and the physical size of its components may be an issue (e.g., in mobile computing devices).

ECC memory is memory that can detect and correct internal data corruption in the memory. Similarly, parity check mechanisms can also detect internal data corruption in memory. Without ECC memory or parity check mechanisms, the GPU subsystem may not be able to detect transient or permanent faults in the GPU subsystem. Another challenge is the absence of built-in runtime diagnostics. Without built-in runtime diagnostics, there may be an inability to detect random logic errors during operation of the GPU subsystem. Another challenge is the dependence of the GPU subsystem on components outside of the GPU, such as buses that carry data between the GPU and memory, which may introduce a possibility of undetected failures. In addition, it may be costly and/or infeasible to add additional hardware components to detect all such failure modes at their source of entry.

As will be explained in more detail below, aspects of the present disclosure are directed to techniques, structures, and devices for ensuring data content integrity of a GPU subsystem that overcomes these and other challenges. A computing device may perform testing of its GPU subsystem to detect whether the hardware components and/or buses in the GPU subsystem introduces any errors into an image rendered by the GPU subsystem.

In accordance with some aspects of the present disclosure, a GPU of a GPU subsystem of a computing device may process graphics data to produce a first plurality of portions of a first image (e.g., "render the first plurality of portions of the first image"), and may process the same graphics data to produce a second plurality of portions of a second image (e.g., "render the second plurality of portions of the second image"). To render the first image, the GPU may render a portion (i.e., less than the entirety) of the first image at a time, and may generate a data integrity check value for each of the respective portions of the first image. To render the second image, the GPU may render a portion of the second image at a time, generate a data integrity check value for the respective portion of the second image, and determine whether the rendered portion of the second image matches a corresponding portion of the first image by comparing the data integrity check value of the rendered portion of the second image with the data check integrity check value of the corresponding portion of the first image. If the data integrity check value of the portion of the second image does not match the data integrity check value of the corresponding portion of the first image, or if the number of data integrity check values associated with portions of the second image that do not match the data integrity check values associated with corresponding portions of the first image exceeds a threshold, the GPU may determine that a fault has occurred in the GPU subsystem.

The GPU may determine that a fault has occurred in the GPU subsystem without rendering the entire second image. Because the GPU may render an image one portion at a time, such as when the GPU operates in a tile-based rendering mode, the GPU may be able to determine whether an operational fault has occurred in the GPU subsystem before it has rendered the entire second image. For example, if the GPU determines that the number of rendered tiles of the second image that do not match a corresponding tile of the first image exceeds a threshold, the GPU may determine that an operational fault has occurred and may cease the rendering of any additional tiles of the second image. Because it is possible for the number of rendered tiles of the second image that do not match a corresponding tile of the first image to exceed the threshold prior to the GPU rendering every one of the tiles making up the second image, the GPU may be able to determine whether an operational fault has occurred in the GPU subsystem before it has rendered the entire second image.

To render an image, GPU may render an image from a list of graphics primitives, such as points, lines, triangles, quadrilaterals, triangle strips, and the like, and may perform one or more graphics operations on the list of graphics primitives. An image may be a set of pixel data, and the set of pixel data making up an image may be arranged as a rectangle (e.g., a 1920×1080 block of pixel data) or any other suitable arrangement (e.g., a circle, an irregular arrangement, and the like). In some examples, terms such as "frame," "surface," "texture," and the like may be used in place of the term "image," and may also refer to a set of pixel data.

The images rendered by the GPU by processing the same graphics data should be the same. However, operational faults in the GPU subsystem may cause the GPU to produce different images when rendering images by processing the same graphics data. If the computing device determines that the image rendered by the GPU as a result of processing graphics data is different from the image rendered by the GPU as a result of processing the same graphics data, the computing device may therefore determine that an operational fault exists in the GPU subsystem.

The techniques disclosed herein may improve the ability to ensure data content integrity of the GPU subsystem compared with previous techniques, and may overcome the challenges faced by current GPU subsystems, as discussed above. The techniques disclosed herein may be performed at speed during the normal course of operations of the GPU. In other words, the techniques disclosed herein may enable the GPU to perform concurrent and online testing of itself to detect operational faults without entering a dedicated test mode.

Due to the temporal separation between the multiple rendering passes performed by the GPU subsystem, the techniques disclosed herein may potentially be relatively more likely to detect intermittent operational faults or transient operational faults compared with previous techniques. Further, because the GPU subsystem may utilize buses and/or hardware components both within and external to the GPU when rendering images, the techniques disclosed herein may enable the computing device to detect operational faults that occur in the hardware components and/or buses in the GPU subsystem that are external to the GPU.

In addition, because the GPU may utilize both memory internal and external to the GPU when rendering images, the techniques disclosed herein enables the computing device to detect permanent and transient faults of memory within the GPU subsystem without the use of error correcting code (ECC) memory and without parity check mechanisms for the memory.

Further, the techniques disclosed herein may minimize the impact in the silicon or die area of an integrated circuit on which the GPU subsystem is implemented (e.g., a system on chip that contains all or portions of the GPU subsystem) because the techniques disclosed herein may minimize the use of additional hardware components to detect operational faults in the GPU subsystem.

The techniques disclosed herein may enable the GPU subsystem to achieve the hardware architectural metrics set out by the ISO 26262 functional safety standard, including both the Single Point Fault Metric (SPFM) and the Latent Point Fault Metric (LPFM).

FIG. 1 is a block diagram of a device configured to perform one or more of the example techniques described in this disclosure. Device 10 may be a computing device located in an automobile or other vehicle. For ease of illustration and brevity, various components of an automobile are not shown or described. Rather, FIG. 1 illustrates the components for performing example techniques described in this disclosure.

Device 10 is not limited to be an automobile. Other examples of device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone for teleconferencing, an Internet telephone, a handheld device such as a portable video game device or a personal digital assistant (PDA). Additional examples of device 10 include a personal music player, a video player, a display device, a camera, a television, a set-top box, a broadcast receiver device, a server, an intermediate network device, a mainframe computer or any other type of device that processes and/or displays graphical data. For purposes of description, the examples are described with respect to device 10 being an automobile with the understanding that the examples may be extended to other examples of device 10.

As illustrated in the example of FIG. 1, device 10 includes lens 12, camera processor 14, a central processing unit (CPU) 16, a graphical processing unit (GPU) 18 and graphics memory 20 of GPU 18, user interface 22, memory controller 24 that provides access to system memory 30, display processor 11, and display interface 26 that outputs signals that cause graphical data to be displayed on one or more displays 28. Bus 32 provides the interconnection of the various components.

Although the various components are illustrated as separate components, in some examples the components may be combined to form a system on chip (SoC). As an example, camera processor 14, CPU 16, GPU 18, display processor 11, and display interface 26 may be formed on a common integrated circuit (IC) chip. In some examples, one or more of camera processor 14, CPU 16, GPU 18, display processor 11, and display interface 26 may be in separate IC chips. Various other permutations and combinations are possible, and the techniques should not be considered limited to the example illustrated in FIG. 1.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of graphics memory 20 include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 32 (also known as "external bus 32"). Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

One or more displays 28 display pertinent information to the driver or passengers. Examples of one or more displays 28 include a monitor, a liquid crystal display (LCD), a plasma display panel, a light emitting diode (LED) array, a touch panel, and the like.

In some examples, there may be only one display 28 in device 10, such as one large screen that functions as user interface 22 as well as the "dashboard" that displays information such as speed, temperature, gas level, battery level, and other such information, and outputs images captured by camera processor 14. In some examples, there may be a plurality of displays 28. For instance, one of displays 28 may be the dashboard behind the steering wheel, another one of displays 28 may be the screen that shows information such as distance traveled, temperature settings, and the like.

There may be one GPU, like GPU 18, and one display interface, like display interface 26, associated with each one of displays 28, or there may be a single GPU 18 and single display interface 26 for each one of displays 28. In the examples described in this disclosure, there is one GPU 18 and one display interface 26 for each one of displays 28. However, the example techniques are applicable also to where there are multiple ones of GPU 18 and multiple ones of display interface 26.

GPU 18 may be configured to perform graphics operations to render one or more graphics primitives to displays 28. Thus, when one of the software applications executing on CPU 16 requires graphics processing, CPU 16 may provide graphics commands and graphics data to GPU 18 for rendering to displays 28. The graphics data may include, e.g., drawing commands, state information, primitive information, texture information, etc. GPU 18 may, in some instances, be built with a highly-parallel structure that provides more efficient processing of complex graphic-related operations than CPU 16. For example, GPU 18 may include a plurality of processing elements, such as shader units, that are configured to operate on multiple vertices or pixels in a parallel manner. The highly parallel nature of GPU 18 may, in some instances, allow GPU 18 to draw graphics images (e.g., GUIs and two-dimensional (2D) and/or three-dimensional (3D) graphics scenes) onto display 28 more quickly than drawing the scenes directly to displays 28 using CPU 16.

GPU 18 may, in some instances, be integrated into a motherboard of computing device 10. In other instances, GPU 18 may be present on a graphics card that is installed in a port in the motherboard of computing device 10 or may be otherwise incorporated within a peripheral device configured to interoperate with computing device 10. GPU 18 may include one or more processors, such as one or more microprocessors, application specific integrated circuits (ASICs), field programmable gate arrays (FPGAs), digital signal processors (DSPs), or other equivalent integrated or discrete logic circuitry. GPU 18 may also include one or more processor cores, so that GPU 18 may be referred to as a multi-core processor.

GPU 18 may be directly coupled to graphics memory 20. Thus, GPU 18 may read data from and write data to graphics memory 20 without using a bus. In other words, GPU 18 may process data locally using a local storage, instead of off-chip memory. Such graphics memory 20 may be referred to as on-chip memory. This allows GPU 18 to operate in a more efficient manner by eliminating the need of GPU 18 to read and write data via a bus, which may experience heavy bus traffic. In some instances, however, GPU 18 may not include a separate memory, but instead utilize system memory 30 via a bus 32. Graphics memory 20 may include one or more volatile or non-volatile memories or storage devices, such as, e.g., RAM, SRAM, DRAM, EPROM, electrically erasable programmable ROM (EEPROM, Flash memory, a magnetic data media or an optical storage media. In some examples, GPU 18 may store a fully formed image in system memory 30, where the image may be one or more surfaces. A surface, in some examples, may be a two-dimensional block of pixels, where each of the pixels may have a color value.

Display processor 11 may include one or more hardware units that retrieves images stored in system memory 30, performs one or more image processing operations on the retrieved images, and outputs the processed images to display(s) 28. In other words, display processor 11 retrieves an image from system memory 30 and may output values that cause the pixels of display(s) 28 to illuminate to display the image. In some examples, display processor 11 may be configured to perform image processing operations on the image retrieved from system memory 30 to be displayed by display(s) 28. Such image processing operations may include format converting, scaling, rotation, blending, and compositing, layering of the image with additional graphics, and the like. In general, display processor 11 may perform some operations that are generally not expected to change the content of images in some use cases (e.g., compositing operations), and may perform other operations that are generally expected to change the content of image in such use cases (e.g., by adjusting hue, saturation, brightness, etc.).

The configuration of display processor 11 in FIG. 1 is exemplary. In other examples, display processor 11 may be configured to receive visual content from any source, such as CPU 16, GPU 18, camera processor 14, or any digital signal process (DSP), video processing unit, image processing unit, pixel processing unit, memory storing visual content, or any other source.

As used herein, the term "visual content" includes but is not limited to any graphics data, graphical data, video data, image data, pixel data, graphics content, graphical content, video content, image content, pixel content, and/or any other type of content that may be displayed.

User interface 22 is used in this disclosure to generically refer to ways in which a driver or passenger may interact with device 10. For instance, user interface 22 may be switches on the side of the steering wheel that the driver may use to cycle through radio stations. User interface 22 may include the gear stick that the driver uses to shift the car into gear or reverse. In some examples, user interface 22 may be part of one or more displays 28, such as in examples where one of displays 28 is a touch panel.

Camera processor 14, CPU 16, and GPU 18 may be configured to generate image content for display by one or more displays 28. For example, camera processor 14 is configured to receive electrical currents as sensor signals from respective pixels of lens 12 and process the electrical currents to generate pixel data of images. One example of lens 12 is the backup camera of an automobile. Camera processor 14 may be configured as a single-input-multiple-data (SIMD) architecture. Camera processor 14 may perform the same operations on current received from each of the sensors on each of lens 12. Each lane of the SIMD architecture may include an image pipeline. The image pipeline includes hardwire circuitry and/or programmable circuitry (e.g., at least one of fixed-function or programmable circuitry) to process the output of the sensors to generate pixel values for pixels to be in a displayed image.

For example, each image pipeline of camera processor 14 may include respective trans-impedance amplifiers (TIAs) to convert the current to a voltage and respective analog-to-digital converters (ADCs) that convert the analog voltage output into a digital value. The current outputted by each pixel indicates the intensity of a red, green, or blue component.

In addition to converting analog current outputs to digital values, camera processor 14 may perform some additional post-processing to increase the quality of the final image. For example, camera processor 14 may evaluate the color and brightness data of neighboring image pixels and perform demosaicing to update the color and brightness of the image pixel. Camera processor 14 may also perform noise reduction and image sharpening, as additional examples. Camera processor 14 outputs the resulting images (e.g., pixel values for each of the image pixels) to system memory 30 via memory controller 24.

CPU 16 may comprise a general-purpose or a special-purpose processor that controls operation of device 10. A user may provide input to device 10 to cause CPU 16 to execute one or more software applications. The software applications that execute on CPU 16 may include, for example, a graphical user interface application or another program. As an example, CPU 16 may execute one or more software applications that generate image content for icons shown on one or more displays 28. As another example, in response to the user placing the automobile in reverse, CPU 16 may execute an application that causes camera processor 14 to process the image content captured by lens 12. As another example, CPU 16 may execute an application that generates image content indicating the battery level, fuel level, temperature, etc.

The above example applications that CPU 16 executes are examples where CPU 16 generates image content for display. However, there may be other example applications that CPU 16 executes that do not generate image content such as the operating system. Furthermore, rather than executing applications to generate the image content, CPU 16 may be hardwired to generate the image content. For instance, rather than executing an application on programmable circuitry to determine the fuel level based on information received from a fuel sensor, CPU 16 may be hardwired to determine the fuel level with specialized fixed-function circuitry that receive information from the fuel sensor and outputs information indicating the fuel level. In some cases, even in such examples, CPU 16 may execute an application that receives the information indicating the fuel level from the fixed-function circuitry and generates graphical commands so that GPU 18 can generate image content showing the fuel level.

There may be various combinations and permutations of using fixed-function and programmable circuitry for CPU 16 to generate information that is to be displayed on one or more displays 28. The above provide some examples, and such examples should not be considered limiting.

The software applications that execute on CPU 16 may include one or more graphics rendering instructions that instruct GPU 18 to cause the rendering of graphics data for storage in system memory 30 and/or for display on display 28. In some examples, the software instructions may conform to a graphics application programming interface (API), such as, e.g., an Open Graphics Library (OpenGL®) API, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

As one example, CPU 16 may determine the miles-per-gallon that the automobile is achieving, and generate graphics rendering instructions that instruct GPU 18 to generate image content showing the miles-per-gallon. As another example, the driver may be reversing the automobile, and in response, CPU 16 may cause one or more displays 28 to display image content capture by lens 12 (e.g., backup camera) and processed by camera processor 14. In addition, CPU 16 may determine angle of movement of the automobile, and generate graphical information showing the path of automobile in reverse. CPU 16 may generate graphics rendering instructions for GPU 18 to draw the path of the automobile that is superimposed on the images processed by camera processor 14. Accordingly, GPU 18 may be configured to generate image content for an automobile application while the automobile is in operation.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting images from camera processor 14 and GPU 18, etc. System memory 30 may additionally store information for use by and/or generated by other components of device 10. For example, system memory 30 may act as a device memory for camera processor 14. System memory 30 may include one or more volatile or non-volatile memories or storage devices, such as, for example RAM, SRAM, DRAM, ROM, EPROM, EEPROM, flash memory, a magnetic data media or an optical storage media.

In some examples, system memory 30 may include instructions that cause camera processor 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like in respective buffers that are allocated within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Automobiles operate according to a high-level of safety compliance, and the ISO 26262 is the functional safety standard for road vehicles. Part of the operations of GPU 18, or other processors configured to generate visual content for display, may fall under the safety critical Advanced Driver Assistance Systems (ADAS). One of the ISO 26262 requirements for ADAS is ensuring integrity, typically through online (during operation) self-tests, for various hardware components involved in safety critical use cases, such as GPU 18.

A GPU subsystem of computing device 10 may encompass the processors, memories, buses, and other components of computing device 10 that operates to generate graphical images that are displayed by displays 28. For example, the GPU subsystem of computing device 10 may include GPU 18, graphics memory 20, system memory 30, bus 32. In some examples, the GPU subsystem of computing device 10 may further include display processor 11, camera processor 14, CPU 16, memory controller 24, display interface 26, and displays 28.

This disclosure describes example techniques for concurrent and on-line field testing of hardware components such as GPU 18, graphics memory 20, system memory 30, and bus 32 making up at least a portion of the GPU subsystem. The field tests may be performed while device 10 is in operation (e.g., while a vehicle in which device 10 is embedded is being driven).

In general, the techniques of this disclosure include performing the same graphics operation twice (e.g., an operation for rendering or generally producing an image) to render all or portions of two images using GPU 18. GPU 18 may process graphics data to produce a first plurality of portions of a first image, where the first plurality of portions of the first image form an entirety of the first image, and may generate a first plurality of data integrity check values associated with the first plurality of portions of the first image. GPU 18 may process the same graphics data to produce a second plurality of portions of a second image, wherein the second plurality of portions of the second image form all or less than an entirety of the second image, and may generate a second plurality of data integrity check values associated with the second plurality of portions of the second image. GPU 18 may determine whether an operational fault has occurred in the GPU subsystem based at least in part on comparing the first plurality of data integrity check values associated with the first plurality of portions of the first image with the second plurality of data integrity check values associated with the second plurality of portions of the second image. If GPU 18 determines that an operational fault has occurred, GPU 18 may issue a warning (e.g., an interrupt).

The techniques of this disclosure may be useful to ensure that the GPU subsystem is operational, without fault, for safety critical automotive applications such as ADAS, or applications like Instrument Cluster display systems, and surround view systems that use GPU 18. The techniques described in this disclosure may provide a systematic methodology to ensure integrity of logic of GPU 18, graphics memory 20, and system memory 30.

Figure 2:
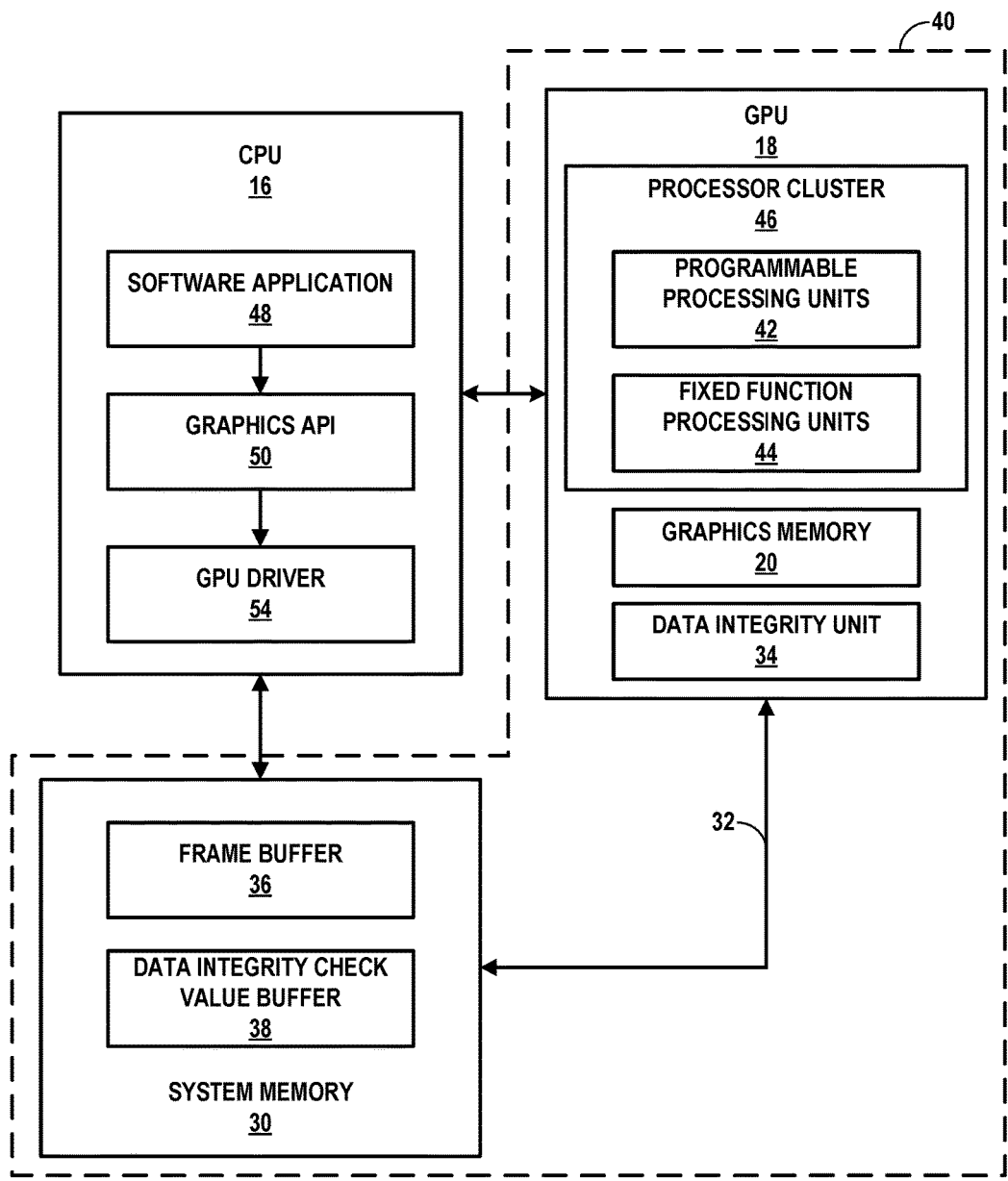
FIG. 2 is a block diagram illustrating an example CPU, GPU, and system memory of the example computing device of FIG. 1 in further detail.

FIG. 2 is a block diagram illustrating CPU 16, GPU 18 and system memory 30 of computing device 10 of FIG. 1 in further detail. As shown in FIG. 2, CPU 16 is communicatively coupled to GPU 18 and system memory 30, such as via bus 32, and GPU 18 is communicatively coupled to CPU 16 and system memory 30, such as via bus 32. GPU subsystem 40 may include GPU 18, system memory 30, and bus 32 that communicatively couples GPU 18 to system memory 30.

GPU 18 may, in some examples, be integrated onto a motherboard with CPU 16. In additional examples, GPU 18 may be implemented on a graphics card that is installed in a port of a motherboard that includes CPU 16. In further examples, GPU 18 may be incorporated within a peripheral device that is configured to interoperate with CPU 16. In additional examples, GPU 18 may be located on the same microchip as CPU 16 forming a system on a chip (SoC). CPU 16 is configured to execute software application 48, graphics API 50, and a GPU driver 54. GPU 18 includes a processor cluster 46 and graphics memory 20.

Software application 48 may be any application that utilizes the functionality of GPU 18. For example, software application 48 may be a GUI application, an operating system, a portable mapping application, a computer-aided design program for engineering or artistic applications, a video game application, or another type of software application that uses 2D or 3D graphics.

Software application 48 may include one or more drawing instructions that instruct GPU 18 to render a graphical user interface (GUI) and/or a graphics scene. For example, the drawing instructions may include instructions that define a set of one or more graphics primitives to be rendered by GPU 18. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 48 may issue one or more graphics rendering commands to GPU 18 (e.g., through GPU driver 54) to cause GPU 18 to perform some or all of the rendering of the graphics data. In some examples, the graphics data to be rendered may include a list of graphics primitives, e.g., points, lines, triangles, quadrilaterals, triangle strips, etc. In particular, software application 48 may invoke GPU driver 54, via graphics API 50, to issue one or more commands to GPU 18 for rendering one or more graphics primitives into displayable graphics images. For example, software application 48 may invoke GPU driver 54, via graphics API 50, to provide primitive definitions to GPU 18. In some instances, the primitive definitions may be provided to GPU 18 in the form of a list of drawing primitives, e.g., triangles, rectangles, triangle fans, triangle strips, etc.

The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by software application 48 to GPU driver 54, GPU driver 54 may formulate one or more commands that specify one or more operations for GPU 18 to perform in order to render one or more primitives. GPU driver 54 may also specify the rendering mode in which GPU 18 is to operate, and may include an indication of the rendering mode in which GPU 18 is to operate in the one or more commands that GPU driver 54 formulates and sends to GPU 18. The one or more operations for GPU 18 to perform in order to render one or more primitives as specified by the one or more commands sent from GPU driver 54 to GPU 18 may be referred to as "graphics data" throughout the disclosure. The term "graphics data" that is processed by GPU 18, however, should be understood as not including an indication of the rendering mode in which GPU 18 is to operate. In other words, GPU 18 may process the same graphics data while operating in any one of a plurality of rendering modes.

When GPU 18 receives the one or more commands from GPU driver 54 of CPU 16, processor cluster 46 may execute a graphics processing pipeline to decode the command and may configure the graphics processing pipeline to perform the operation specified in the command. For example, a command engine of the graphics processing pipeline may read primitive data and assemble the data into primitives for use by the other graphics pipeline stages in the graphics processing pipeline. After performing the specified operations, GPU 18 outputs the rendered data to frame buffer 36.

Frame buffer 36 stores destination pixels for GPU 18. Each destination pixel may be associated with a unique screen pixel location. In some examples, frame buffer 36 may store color components and a destination alpha value for each destination pixel. For example, frame buffer 36 may store Red, Green, Blue, Alpha (RGBA) components for each pixel where the "RGB" components correspond to color values and the "A" component corresponds to a destination alpha value that indicates the transparency of the pixel. Frame buffer 36 may also store depth values for each destination pixel. In this way, frame buffer 36 may be said to store an image (e.g., a surface). Although frame buffer is illustrated as being included in system memory 30, in other examples, frame buffer 36 and system memory 30 may be separate memory units. Once GPU 18 has rendered all of the pixels of a frame into frame buffer 36, frame buffer may output the finished frame to display 28 for display.

Processor cluster 46 may include one or more programmable processing units 42 and/or one or more fixed function processing units 44. In some examples, processor cluster 46 may perform the operations of a graphics processing pipeline. Programmable processing unit 42 may include, for example, programmable shader units that are configured to execute one or more shader programs that are downloaded onto GPU 18 from CPU 16. In some examples, programmable processing units 42 may be referred to as "shader processors" or "unified shaders," and may perform geometry, vertex, pixel, or other shading operations to render graphics. The shader units may each include one or more components for fetching and decoding operations, one or more ALUs for carrying out arithmetic calculations, one or more memories, caches, and registers.

GPU 18 may designate programmable processing units 42 to perform a variety of shading operations such as vertex shading, hull shading, domain shading, geometry shading, fragment shading, and the like by sending commands to programmable processing units 42 to execute one or more of a vertex shader stage, tessellation stages, a geometry shader stage, a rasterization stage, and a fragment shader stage in the graphics processing pipeline. In some examples, GPU driver 54 may cause a compiler executing on CPU 16 to compile one or more shader programs, and to download the compiled shader programs onto programmable processing units 42 contained within GPU 18. The shader programs may be written in a high-level shading language, such as, e.g., an OpenGL Shading Language (GLSL), a High-Level Shading Language (HLSL), a C for Graphics (Cg) shading language, an OpenCL C kernel, etc. The compiled shader programs may include one or more instructions that control the operation of programmable processing units 42 within GPU 18. For example, the shader programs may include vertex shader programs that may be executed by programmable processing units 42 to perform the functions of the vertex shader stage, tessellation shader programs that may be executed by programmable processing units 42 to perform the functions of the tessellation stages, geometry shader programs that may be executed by programmable processing units 42 to perform the functions of the geometry shader stage, low resolution z-culling programs that may be executed by programmable processing units 42 to perform low resolution z-culling, and/or fragment shader programs that may be executed by programmable processing units 42 to perform the functions of the fragment shader stage. A vertex shader program may control the execution of a programmable vertex shader unit or a unified shader unit, and include instructions that specify one or more per-vertex operations.

Processor cluster 46 may also include fixed function processing units 44. Fixed function processing units 44 may include hardware that is hard-wired to perform certain functions. Although fixed function processing units 44 may be configurable, via one or more control signals for example, to perform different functions, the fixed function hardware typically does not include a program memory that is capable of receiving user-compiled programs. In some examples, fixed function processing units 44 in processor cluster 46 may include, for example, processing units that perform raster operations, such as, e.g., depth testing, scissors testing, alpha blending, low resolution depth testing, etc. to perform the functions of the rasterization stage of the graphics processing pipeline.

Graphics memory 20 is on-chip storage or memory that is physically integrated into the integrated circuit of GPU 18. In some instances, because graphics memory 20 is on-chip, GPU 18 may be able to read values from or write values to graphics memory 20 more quickly than reading values from or writing values to system memory 30 via a system bus. Thus, GPU 18 may read data from and write data to graphics memory 20 via an internal bus without using an external bus. In other words, GPU 18 may process data locally using a local storage, instead of off-chip memory. Such graphics memory 20 may be referred to as on-chip memory. This allows GPU 18 to operate in a more efficient manner by eliminating the need of GPU 18 to read and write data via an external bus, which may experience heavy bus traffic and associated contention for bandwidth.

GPU 18 may render a graphics image according to a particular rendering mode, such as a tile-based rendering mode. When rendering according to a tile-based rendering mode, GPU 18 may receive one or more commands that specify one or more operations for GPU 18 to perform in order to render a batch of primitives (i.e., one or more primitives) into a resulting graphics image. To render the batch of primitives, GPU 18 may first perform a binning pass (also known as a tiling pass) to subdivide the resulting graphics image into a plurality of smaller portions (e.g., tiles of pixels or bins). During the binning pass, GPU 18 may determine which of the batch of primitives belongs to which tile, such as by performing primitive-bin intersection tests, and may divide the batch of primitives into corresponding bins, so that each bin is associated with the primitives that belongs to a particular tile.

For each of the bins, processor cluster 46 then performs a rendering pass to render the bin into a tile in graphics memory 20 located locally on GPU 18, including performing a separate graphics processing pipeline to render each tile. Once a tile has been rendered to graphics memory 20, GPU may read the rendered tile from graphics memory 20 and store the tile in a render target, such as frame buffer 36. The size of the tiles can be configured to represent the amount of data that is available in graphics memory 20. For example, if graphics memory 20 has a capacity of 512 kB, the size of a tile may be configured so that pixel data contained in that tile is less than or equal to 512 kB. In this way, processor cluster 46 may, tile-by-tile, render a plurality of tiles that make up an image in order to render the entire image.

During the binning pass, GPU 18 may perform low resolution z-culling to determine, for each primitive in the graphical scene, whether or not the particular primitive is visible in a rendered tile, and may generate a visibility stream that indicates whether each of the primitives may be visible in the finally rendered scene. If GPU 18 determines that the particular primitive will not be visible in a rendered tile, GPU 18 may refrain from performing a rendering pass to render the particular primitive.

As discussed above, graphics memory 20 may be of a size sufficient to hold one tile of the graphics image. Thus, as part of a single rendering pass for a particular portion (i.e., tile) of the image, processor cluster 46 may render all or a subset of the batch of primitives with respect to a particular subset of the destination pixels (e.g., a particular tile of destination pixels) of the image as a tile of the image to graphics memory 20, and GPU 18 may transfer the rendered tile (e.g., resolve the tile) from graphics memory 20 to frame buffer 36. After performing a first rendering pass (and a first binning pass) with respect to a first tile, processor cluster 46 may perform a second rendering pass (and a second binning pass) with respect to a second tile, and so on, until each tile of the image has been rendered and transferred to frame buffer 36 to form the image. Processor cluster 46 may incrementally traverse through each of the tiles until the primitives associated with every tile have been rendered.

Data integrity unit 34 may be a hardware unit, such as logic circuitry, and the like, that is configured to generate a data integrity check value for each tile rendered by GPU 18. Data integrity unit 34 may generate a data integrity check value for a tile based at least in part on the pixel data included in the tile. A data integrity check value may be a cyclic redundancy check (CRC) code, a checksum, a hash value or other type of value generated to check the validity of raw data (e.g., image data). A CRC code is an error-detecting code that is often used to detect changes in data. CRCs are generated using cycle codes that produce a value that is a function of one or more characteristics of the raw data (e.g., image data). A hash function is a function that maps data of an arbitrary size to data of a fixed size. Hash functions are sometimes used in a hash table for accelerated lookup of duplicated records. Hash functions may also be used to generate data integrity check values for image data before and after processing. In some examples, a hash function for a tile is referred to as a tile-based hash code A checksum is data produced by an algorithm operating on data (e.g., image data) in order to detect errors during transmission, processing, or storage. In other examples, such a check value may be a multiple independent signature register (MISR), a linear feedback shift register (LFSR), and the like, though other techniques may be used.

As discussed above, each rendered tile is a block (e.g., 8×8) of pixels, where each pixel has a pixel value (e.g., a color value). Data integrity unit 34 may generate different data integrity check values for tiles that contain different patterns of pixel values (e.g., a tile completely filled with red pixels versus a tile containing a checkboard pattern of red and blue pixels). Conversely, data integrity unit 34 may generate the same data integrity check values for tiles that contain the same patterns of pixel values (e.g., two tiles that are each completely filled with red pixels). Thus, if two tiles are associated with the same data integrity check values (i.e., the data integrity check value associated with a first tile matches the data integrity check value associated with a second tile, then the first tile also matches the second tile).

In accordance with some aspects of the present disclosure, GPU 18 may detect operational faults within GPU subsystem 40 by processing the same graphics data twice and comparing portions of two images by comparing data integrity check values associated with corresponding portions of the two images. If the number of portions of the two images that do not match exceeds a threshold, then GPU 18 may determine that an operational fault has occurred in GPU subsystem 40. In some examples, GPU 18 may process the same graphics data twice for each piece of graphics data it receives. In other examples, GPU 18 may periodically process the same graphics data twice. For example, if GPU 18 processes a plurality of frames that make up a video, GPU 18 may process every n-th frame twice, or process a frame twice every m-th second, and the like.

In particular, CPU 16 may direct GPU 18 to process the same graphics data two times to render two images based on the same graphics data. GPU 18 may receive from CPU 16 a first set of one or more commands that specify one or more operations for GPU 18 to perform in order to render one or more primitives (i.e., graphics data). In response to receiving the first set of one or more commands from CPU 16, GPU 18 may process the graphics data to produce a first image GPU 18 may operate in a tile-based rendering mode to produce a plurality of tiles making up the first image. When operating in a tile-based rendering mode, GPU 18 may produce a plurality of tiles that form the first image. In particular, GPU 18 may divide the graphics data into a plurality of bins. For each of the plurality of bins, GPU 18 may render the respective bin as a tile into graphics memory 20, and data integrity unit 34 may generate a data integrity check value for the tile. GPU 18 may store the tile from graphics memory 20 to frame buffer 36 in memory 30 via bus 32, and may store the data integrity check value associated with the tile into data integrity check value buffer 38 in system memory 30 via bus 32.

In this way, GPU 18 renders a plurality of tiles that form the image, and data integrity unit 34 generates a data integrity check value for each of the plurality of tiles, so that data integrity unit 34 generates a plurality of data integrity check values associated with the plurality of tiles. GPU 18 may store the plurality of tiles that form the first image into frame buffer 36, and may store the plurality of data integrity check values associated with the plurality of tiles into data integrity check value buffer 38 in system memory 30.

GPU 18 may also receive from CPU 16 a second set of one or more commands that specify one or more operations for GPU 18 to perform in order to render one or more primitives (i.e., graphics data). The first set of one or more commands may specify the same graphics data as the graphics data specified by the second set of one or more commands. In other words, the graphics data specified by the first set of one or more commands may be the same as the graphics data specified by the second set of one or more commands.

Because GPU 18 receives the same graphics data as part of both the first set of one or more commands and the second set of one or more commands, the images rendered by GPU 18 as a result of processing the graphics data should be identical. If the images rendered by GPU 18 are not identical, computing device 10 can determine that an operational fault has occurred in GPU subsystem 40.

In some examples, software application 48 may explicitly invoke GPU driver 54 once. In response to receiving a single invocation from software application 48, GPU driver 54 may formulate two sets of one or more commands that specify GPU 18 to process the same graphics data twice. Specifically, GPU driver 54 may formulate the first set of one or more commands to send to GPU 18 to process graphics data to produce a first image, and may formulate the second set of one or more commands to send to GPU 18 to process the same graphics data to produce a second image. In other words, even if software application 48 does not explicitly direct GPU 18 to render two images, GPU driver 54 may nonetheless formulate two sets of one or more commands that direct GPU 18 to process the same graphics data twice to produce two images.

Thus, software application 48 does not need to explicitly direct GPU 18 to produce two images by processing the same graphics data twice in order to detect operational faults within GPU subsystem 40. Instead, GPU driver 54 may, in response to being invoked once by software application 48 to cause GPU 18 to render an image, formulate two sets of one or more commands, each including the same graphics data, that direct GPU 18 to render two images, in order to detect operational faults within GPU subsystem 40.

As such, while CPU 16 executes software application 48 during the normal course of operation of computing device 10, GPU driver 54 may, when invoked to cause GPU 18 to render an image, automatically formulate two sets of one or more commands that specifies GPU 18 to render two images by processing the same graphics data. In this way, the techniques disclosed herein enables computing device 10 to perform concurrent and online testing of the GPU subsystem while computing device 10 is powered on and performing its normal functionality without needing to modify software application 48 that executes at CPU 16.

In response to receiving the second set of one or more commands from CPU 16, GPU 18 may process the graphics data to produce a plurality of tiles of a second image. In some examples, GPU 18 may process the graphics data to produce a plurality of tiles of a second image without receiving the second set of one or more commands from CPU 16. Instead, GPU 18 may process the first set of one or more commands a second time to produce the plurality of tiles of the second image.

When processing the graphics data to produce a plurality of tiles of a second image, GPU 18 may change its configuration so that it is different from the configuration of GPU 18 when rendering the first image. For example, if GPU 18 includes or is able to execute multiple internal pipelines that operates differently when processing graphics data to produce a plurality of tiles of an image, GPU 18 may be configured to utilize a first internal pipeline when producing the first image and may be configured to utilize a second internal pipeline different from the first internal pipeline when producing the second image. By changing its configuration when processing the graphics data to produce the plurality of tiles of the second image, GPU 18 may utilize different components (e.g., processing units, memories, registers, and the like) and different data paths when processing the graphics data to produce the plurality of tiles of the second image compared with when GPU 18 processes the graphics data to produce the plurality of tiles of the first image. This may enable GPU 18 to test a greater number of components and data paths of GPU 18 and GPU subsystem 40.

GPU 18 may also change its configuration between its rendering of the first and second images by changing the ordering in which pixels of the first and second images are processed. For example, GPU 18 may produce tiles of the first image starting from the upper leftmost tile making up the first image. GPU 18 may subsequently change its configuration to produce tiles of the second image starting from the bottom rightmost tile making up the second image.

GPU 18 may also change its configuration between its rendering of the first and second images by changing the way GPU 18 rasterizes pixels within each primitive of the first and second images. For example, GPU 18 may configure processor cluster 46 to perform rasterization of the pixels of the first image in a first configuration, and may configure processor cluster 46 to perform rasterization of the pixels of the second image in a second configuration different from the first configuration. Regardless of its configuration, GPU 18 should produce a tile of the second image from the graphics data that is identical to a corresponding tile of the first image produced by GPU 18 from the graphics data if no operational faults have occurred in GPU subsystem 40.

When operating in a tile-based rendering mode, GPU 18 may divide the graphics data into a plurality of bins. For each of the plurality of bins, GPU 18 may render the respective bin as a tile of the second image into graphics memory 20, and data integrity unit 34 may generate a data integrity check value for the tile.

For each tile of the second image rendered into graphics memory 20, GPU 18 may determine whether the rendered tile matches a corresponding tile of the first image. Two tiles from two images corresponds to each other if the two tiles form the same portions of two images and occupy the same block of pixels in the two images. For example, if the rendered tile is a tile that forms a 64×64 pixel block of the second image from pixel location (0, 63) to pixel location (63,127), then the corresponding tile of the first image is a 64×64 pixel block of the first image from pixel location (0, 63) to pixel location (63,127) of the first image.

To determine whether the rendered tile matches the corresponding tile of the first image, data integrity unit 34 may compare the data integrity check value generated for the rendered tile with the corresponding data integrity check value associated with the corresponding tile of the first image that is stored in data integrity check value buffer 38. Data integrity unit 34 may retrieve the corresponding data integrity check value associated with the corresponding tile of the first image from data integrity check value buffer 38 in system memory 30, and may compare the data integrity check value generated for the rendered tile with the corresponding data integrity check value associated with the corresponding tile of the first image.

If the data integrity check value generated for the rendered tile matches the corresponding data integrity check value associated with the corresponding tile of the first image, then the rendered tile matches the corresponding tile of the first image. In this case, GPU 18 may refrain from storing the rendered tile into frame buffer 36, and may refrain from storing the data integrity check value generated for the rendered tile into data integrity check value buffer 38.

On the other hand, if the data integrity check value generated for the rendered tile does not match the corresponding data integrity check value associated with the corresponding tile of the first image, then the rendered tile does not match the corresponding tile of the first image. In this case, GPU 18 may store the rendered tile into frame buffer 36, and may store the data integrity check value generated for the rendered tile into data integrity check value buffer 38. By storing the rendered tile into frame buffer 36, and by storing the data integrity check value generated for the rendered tile into data integrity check value buffer 38, GPU 18 may overwrite the corresponding tile of the first image stored in frame buffer 36, and may overwrite the corresponding data integrity check value stored in data integrity check value buffer 38.

As can be seen, GPU 18 does not allocate an additional output buffer or frame buffer in system memory 30 to store tiles of the second image, and does not allocate an additional buffer in system memory 30 to store data integrity check values associated with the tiles of the second image. Instead, when a tile of the second image does not match a corresponding tile of the first image, GPU 18 may overwrite the corresponding tile of the first image stored in frame buffer 36 with the tile of the second image. In this way, the techniques discussed herein minimizes memory usage and conserves the computational resources of computing device 10.

When data integrity unit 34 determines that a tile of the second image does not match the corresponding tile of the first image, then GPU 18 may determine whether an operational fault has occurred in GPU subsystem 40. In some examples, if a single tile of the second image does not match the corresponding tile of the first image, then GPU 18 may determine that an operational fault has occurred in GPU subsystem 40. In another example, GPU 18 may determine that an operational fault has occurred in GPU subsystem 40 when the number of tiles of the second image that do not match the corresponding tiles of the first image exceeds a threshold (e.g., 1 tile, 2 tiles, 5 tiles, and the like). In another example, GPU 18 may determine that an operational fault has occurred in GPU subsystem 40 when the number of consecutive tiles of the second image rendered by GPU 18 that do not match the corresponding tiles of the first image exceeds a threshold (e.g., 2 tiles, 5 tiles, and the like)

When GPU 18 processes graphics data to produce a plurality of tiles of the second image, GPU 18 may continue to produce tiles of the second image, including generating data integrity check values associated with the tiles and comparing the data integrity check values with corresponding data integrity check values associated with corresponding tiles of the first image until it determines that an operational fault has occurred in GPU subsystem 40, or until all of the tiles of the second image have been produced and the data integrity values associated with the tiles have been compared with corresponding data integrity check values associated with corresponding tiles of the first image.

Thus, according to the examples above, GPU 18 may continue to render tiles of the second image until a single tile of the second image does not match the corresponding tile of the first image, until the number of tiles of the second image that do not match the corresponding tiles of the first image exceeds the threshold, until the number of consecutive tiles of the second image rendered by GPU 18 that do not match the corresponding tiles of the first image exceeds the threshold, or until every tile of the second image has been rendered. Because such a threshold may be reached prior to GPU 18 rendering every tile that makes up the entirety of the second image, GPU 18 does not necessarily have to render all of the tiles making up the entirety of the second image in order determine whether an operational fault has occurred.

In response to determining that an operational fault has occurred in GPU subsystem 40, GPU 18 may generate an interrupt or may output an indication that an operational fault has occurred in GPU subsystem 40. In response to the interrupt, computing device 10 may issue an audible, visible, and/or haptic warning to the user. In other examples, in response to the interrupt, computing device 10 may also initiate a self-recovery process in which error produced by GPU subsystem 40 may be repaired. The self-recovery process may attempt to recover from the error by, for example, routing data away from a component that produced the error (e.g., away from system memory 30 to another memory in computing device 10, or away from bus 32 to another bus, and the like).

If computing device 10 determines that the first image rendered by GPU 18 does not match the second image rendered by GPU 18, when the GPU 18 renders the first and second images based on the same graphics data, then computing device 10 may determine that an operational fault has occurred in GPU subsystem 40, because GPU 18 should produce the same rendered image when processing the same graphics data.

A mismatch between the two rendered images may indicate an operational fault has occurred at graphics memory 20, external bus 32 between graphics memory 20 and frame buffer 36, external bus 32 between processor cluster 46 and frame buffer 36, and/or an internal bus between processor cluster 46 and graphics memory 20.

Such operational faults may not be detected if the same image is rendered only once, because intermittent operational faults or transient operational faults may not always appear at the exact time an image is rendered. In addition, because the techniques disclosed herein include storing data integrity check values via bus 32 to system memory 30, and reading data integrity check values in system memory 30 via bus 32, the techniques disclosed herein may detect operational faults that occur external to GPU 18 (e.g., operational faults that occur in memory 30 or bus 32).

The techniques disclosed herein enables computing device 10 to detect operational faults in GPU subsystem 40 in a way that minimizes the need to add additional hardware components to detect operational faults that occur in GPU subsystem 40, including operational faults that occur at portions of GPU subsystem 40 external to GPU 18.

GPU 18 (or another processing circuit such as CPU 16) may perform concurrent online testing using the techniques discussed above. In other words, GPU 18 may perform a built-in self-test while GPU 18 is powered-on and rendering images. Because GPU 18 performs the built-in self-test concurrently and online, GPU 18 does not perform the built-in self-test by entering into a dedicated test mode. If GPU 18 determines that, during the built-in self-test, GPU 18 has modified an image in an unexpected way, GPU 18 may determine that one or more hardware units or memories accessible by GPU 18 are not operating properly, and may thereby detect a fault in GPU 18.

The techniques described above allow data integrity to be confirmed without using error-correcting code (ECC) memory, which is often not present in display subsystems, including GPUs. In addition, the techniques of this disclosure may be used during normal system operation without entering a dedicated test mode. Furthermore, the techniques of this disclosure may be implemented with minimal impact to die area of a system on a chip (SoC). Also, the techniques of this disclosure may be implemented and employed at the full processing speed of GPU 18 (or another processor). That is, the data integrity checks may occur concurrently with actual operation of computing device 10. The data integrity checks of this disclosure are able to detect both permanent faults and intermittent faults because data integrity testing may be done concurrently and online. In addition, the data integrity checks of this disclosure may enable vehicle manufacturers and vehicle systems manufacturers to achieve hardware architectural metrics as per ISO 26262 functional safety standard (Single Point Fault Metric (SPFM) and Latent Point Fault Metric (LPFM)).

Figure 3:
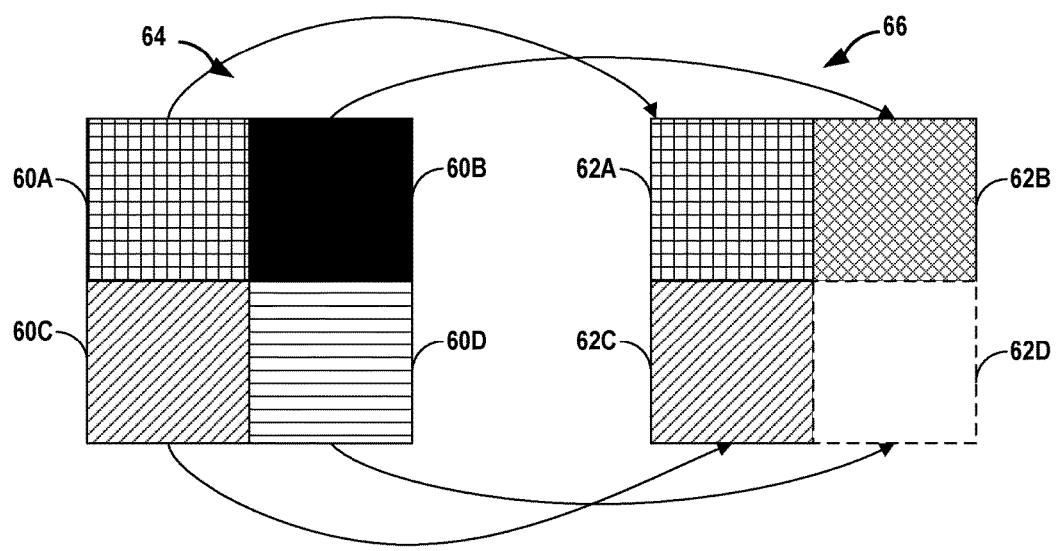
FIG. 3 is a block diagram illustrating corresponding portions of two example images.

FIG. 3 is a block diagram illustrating corresponding portions of two example images. As shown in FIG. 3, image 64 may be a first image produced by GPU 18 as a result of processing graphics data. In particular, GPU 18 may process graphics data to produce portions 60A-60D ("portions 60") of image 64. If image 64 is a 128×128 pixel block, portion 60A may be the portion of image 64 from pixel location (0, 0) to pixel location (63, 63), portion 60B may be the portion of image 64 from pixel location (64, 0) to (127, 63), portion 60C may be the portion of image 64 from pixel location (0, 64) to (63, 127), and portion 60D may be the portion of image 64 from pixel location (64, 64) to (127, 127).

Image 66 may be a second image produced by GPU 18 as a result of processing graphics data. In particular, GPU 18 may produce graphics data to produce portions 62A-62D ("portions 62") of image 66. In some examples, GPU 18 may produce fewer than all of the portions 62A-62D of image 66. For example, GPU 18 may produce portions 62A-62C without producing portion 62D of image 66. If image 66 is a 128×128 pixel block, portion 62A may be the portion of image 66 from pixel location (0, 0) to pixel location (63, 63), portion 62B may be the portion of image 66 from pixel location (64, 0) to (127, 63), portion 62C may be the portion of image 66 from pixel location (0, 64) to (63, 127), and portion 62D may be the portion of image 66 from pixel location (64, 64) to (127, 127).

Portions 60 of image 64 may be an example of tiles of image 64, and portions 62 of image 66 may be an example of tiles of image 66. Each one of the portions 62 of image 66 may correspond with one of the portions 60 of image 64. A portion of an image may correspond to a portion of another image if the two portions occupy the same block of pixels in the two images.

In the example of FIG. 3, portion 62A of image 66 corresponds to portion 60A of image 64 because they each occupy the same block of pixels from pixel location (0, 0) to pixel location (63, 63) of images 66 and 64, respectively. Similarly, portion 62B of image 66 corresponds to portion 60B of image 64 because they each occupy the same block of pixels from pixel location (64, 0) to (127, 63) of images 66 and 64, respectively. Portion 62C of image 66 corresponds to portion 60C of image 64 because they each occupy the same block of pixels from pixel location (0, 64) to (63, 127) of images 66 and 64 respectively. Portion 62D of image 66 corresponds to portion 60D of image 64 because they each occupy the same block of pixels from pixel location (64, 64) to (127, 127) of images 66 and 64, respectively.

GPU 18 may produce portions 60 of image 64 in the same order or in a different order than in which it produces portions 62 of image 66. For example, GPU 18 may produce portions 60 of image 64 one portion at a time by producing portion 60A, followed by portion 60B, followed by portion 60C, and followed by portion 60D. Meanwhile, GPU 18 may change its configurations to produce portions 62 of image 66 one portion at a time by producing portion 62D, followed by portion 62C, followed by portion 62B, followed by portion 62A. In this example, portion 62D of image 66 may be compared to corresponding portion 60D of image 64 prior to portion 62C of image 66 being compared to portion 60C of image 64, portion 62C of image 66 may be compared to portion 60C of image 64 prior to portion 62B of image 66 being compared to portion 60B of image 64, and so on.

Figure 4:
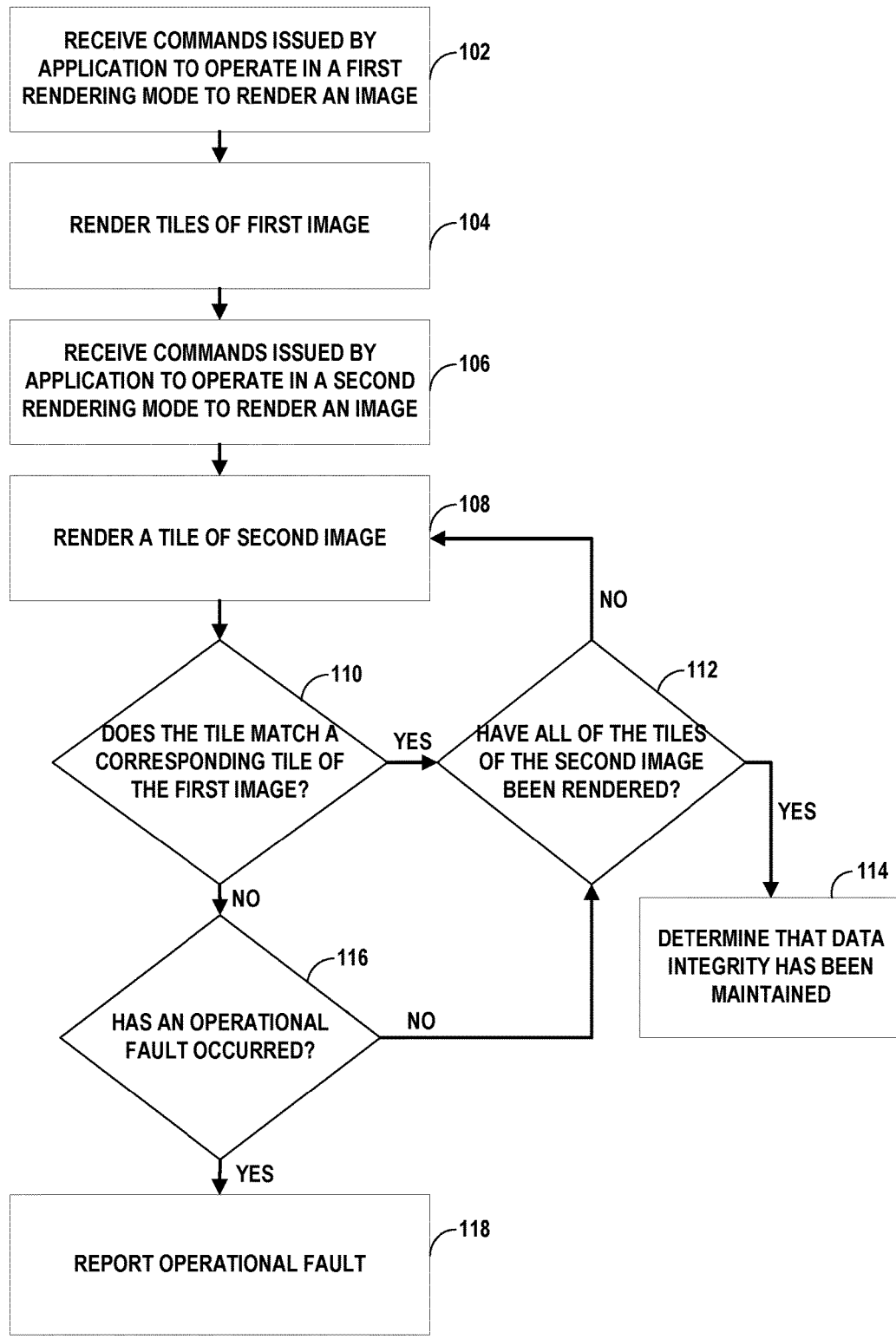
FIG. 4 is a flow chart illustrating an example operation of the computing device in further detail.

FIG. 4 is a flow chart illustrating an example operation of computing device 10 in further detail. As shown in FIG. 4, GPU 18 may receive one or more commands issued by GPU driver 54 of CPU 16 that specifies graphics data that GPU 18 is to process to render an image (102). A software application, such as software application 48, may invoke GPU driver 54 to issue one or more commands to GPU 18 to render the image. In response, GPU driver 54 may generate a command stream that provides instructions for GPU 18 for processing the set of operations and the set of primitives to render the image that may be stored in frame buffer 36. Such instructions may be executed by processor cluster 46 to perform the set of operations on the set of primitives to render the image.

In response to receiving the one or more commands issued by GPU driver 54, GPU 18 may operate in a tile-based rendering mode to process the graphics data to produce a plurality of tiles of the first image (104), and may store the plurality of tiles of the first image into frame buffer 36 or another render target.

GPU 18 may receive one or more commands issued by GPU driver 54 of CPU 16 that specifies graphics data that GPU 18 is to process to render an image (106). The graphics data included in the one or more commands issued by CPU 16 may be the same graphics data included in the one or more commands issued by CPU 16 in step 102. A software application, such as software application 48, may invoke GPU driver 54 to issue one or more commands to GPU 18 to render the image. In response, GPU driver 54 may generate a command stream that provides instructions for GPU 18 for processing graphics data to render the image that may be stored in frame buffer 36. Such instructions may be executed by processor cluster 46 process the graphics data to render the image.

As discussed previously, GPU driver 54 may be configured to issue two sets of one or more commands to GPU 18 to direct GPU 18 to process the same graphics data (i.e., perform steps 102 and 106) in response to receiving a single invocation of GPU driver 54 by software application 48 to direct GPU 18 to render an image. In this way, GPU driver 54 transparently directs GPU 18 to render two images from the same graphics data without being invoked twice by software application 48 to direct GPU 18 to render two images from the same graphics data.

In some examples, GPU 18 may generate two sets of one or more commands to process the same graphics data in response to only receiving a single set of one or more commands to process graphics data. In these examples, GPU driver 54 may process the same graphics data twice without being directed to do so by CPU 16.

In response to receiving the one or more commands issued by GPU driver 54, GPU 18 may operate in a tile-based rendering mode to process the graphics data to produce a plurality of tiles of a second image (108). To produce the plurality of tiles of the second image while operating in a tile-based rendering mode, processor cluster 46 may divide the graphics data into a plurality of bins, and may, for each of the bins, render the respective bin as a tile to graphics memory 20.

Upon a tile of the second image being rendered to graphics memory 20, GPU 18 may determine whether the tile matches a corresponding tile of the first image (110). Data integrity unit 34 may generate a data integrity check value associated with the tile, based at least in part on the contents (e.g., pixel data) of the tile. Data integrity unit 34 may retrieve a corresponding data integrity check value associated with a corresponding tile of the first image from data integrity check value buffer 38, and may compare the data integrity check value associated with the tile with the corresponding data integrity check value associated with a corresponding tile of the first image to determine whether the tile of the second image matches a corresponding tile of the first image.

If data integrity unit 34 determines that the data integrity check value associated with the tile matches the corresponding data integrity check value associated with a corresponding tile of the first image, then data integrity may determine that the tile of the second image matches the corresponding tile of the first image. GPU 18 may refrain from storing the tile into frame buffer 36 and may refrain from storing the data integrity check value associated with the tile into data integrity check value buffer 38.

Instead, GPU 18 may determine if all of the tiles making up the second image has been rendered (112). If not, GPU 18 may proceed to render the next tile of the second image to graphics memory 20 (108), generate a data integrity check value associated with the tile, and compare the data integrity check value associated with the tile with a corresponding data integrity check value associated with a corresponding tile of the first image (110). If GPU 18 determines that all of the tiles making up the second images has been rendered, GPU 18 may determine data integrity has been maintained in GPU subsystem 40 when rendering the first image and the second image (114).

If data integrity unit 34 determines that the data integrity check value associated with the tile does not match the corresponding data integrity check value associated with a corresponding tile of the first image, then GPU 18 may store the tile into frame buffer 36 and may store the data integrity check value associated with the tile into data integrity check value buffer 38. Data integrity unit 34 may increment a count of the number of tiles of the first image that does not match corresponding tiles of the second image, a count of the consecutive number of tiles of the first image that does not match corresponding tiles of the second image, and the like.

When the data integrity check value associated with the tile does not match the corresponding data integrity check value associated with a corresponding tile of the first image, GPU 18 may determine whether an operational fault has occurred in GPU subsystem 40 (116). As discussed above, GPU 18 may determine that an operational fault has occurred in GPU subsystem 40 based on one or more of the following conditions: if a single tile of the second image does not match a corresponding tile of the first image, if the number of tiles of the second image that does not match corresponding tiles of the first image exceeds a threshold, and/or if the number of consecutively rendered tiles of the second image that do not match corresponding tiles of the first image exceeds a threshold.

Based on the conditions discussed above, GPU 18 may determine that an operational fault has occurred in GPU subsystem 40 without rendering every tile that makes up the entirety of the second image. For example, GPU 18 may determine that a single tile of the second image does not match a corresponding tile of the first image, and therefore an operational fault has occurred in GPU subsystem 40, before all of the tiles making up the second image has been rendered by GPU 18.

If GPU 18 determines that an operational fault has not occurred in GPU subsystem 40, GPU 18 may determine whether all of the tiles making up the second image has been rendered (112). If not, GPU 18 may proceed to render the next tile of the second image to graphics memory 20 (108), generate a data integrity check value associated with the tile, and compare the data integrity check value associated with the tile with a corresponding data integrity check value associated with a corresponding tile of the first image (110). If GPU 18 determines that all of the tiles making up the second images has been rendered, GPU 18 may determine that data integrity has been maintained in GPU subsystem 40 when rendering the first image and the second image (114).

If GPU 18 determines that an operational fault has occurred in GPU subsystem 40, GPU 18 may report the operational fault (118). GPU 18 may report the fault to a safety processor of computing device 10 that may generate an interrupt, or GPU 18 may itself generate the interrupt. In response to the interrupt, computing device 10 may issue an audible, visible, and/or haptic warning to the user. In other examples, in response to the interrupt, computing device 10 may also initiate a self-recovery processor in which error produced by GPU subsystem 40 may be repaired. The self-recovery processor may attempt to recover from the error by, for example, routing data away from a component that produced the error (e.g., away from system memory 30 to another memory in computing device 10, or away from bus 32 to another bus, and the like). In this way, GPU 18 may operate to detect operational faults that occur in GPU subsystem 40, including detecting operating faults in memory (e.g., system memory 30) and wires/buses (e.g., bus 32) that are external to GPU 18.

Figure 5:
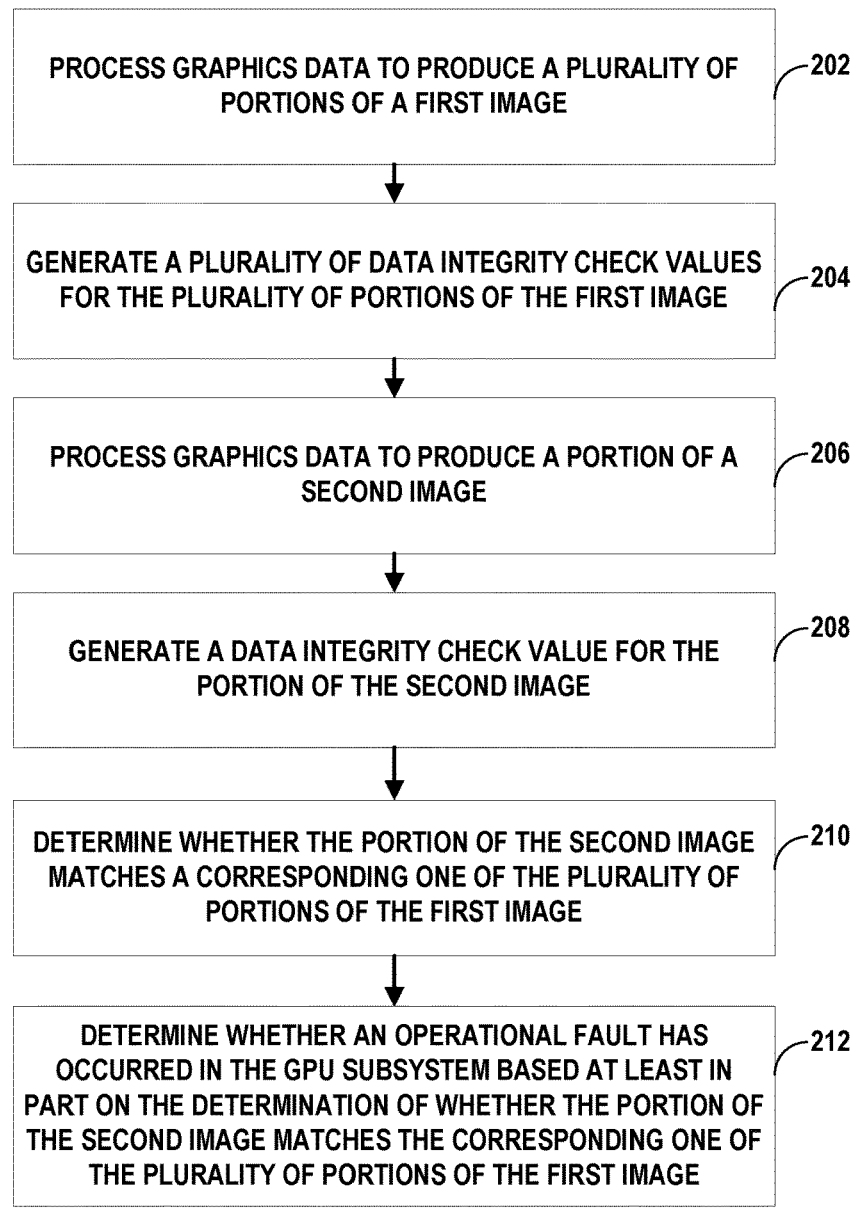
FIG. 5 is a flow chart illustrating an example operation of the computing device in further detail.

FIG. 5 is a flow chart illustrating an example operation of computing device 10 in further detail. As shown in FIG. 5, GPU 18 may process graphics data to produce a plurality of portions of a first image (202). Each one of the plurality of data integrity check values may be associated with a corresponding portion of the first image. The plurality of portions of the first image may include at least a first portion and a second portion. If GPU 18 operates in a tile-based rendering mode, the plurality of portions of the first image may be a first plurality of tiles of the first image. In some examples, the plurality of portions of the first image may form an entirety of the first image.

GPU 18 may generate a plurality of data integrity check values associated with the plurality of portions of the first image (204). The plurality of data integrity check values associated with the plurality of portions of the first image may include a first data integrity check value associated with the first portion and a second data integrity check value associated with the second portion.

GPU 18 may process the graphics data to produce a portion of a second image, or a plurality of portions of a second image (206). The plurality of portions of the second image may include at least a third portion and a fourth portion. Further, the plurality of portions of the second image may, in some instances, include fewer than every portion of the second image. If GPU 18 operates in a tile-based rendering mode, the plurality of portions of the second image may be a second plurality of tiles of the second image. In some examples, the plurality of portions of the second image may form less than the entirety of the second image. In other words, GPU 18 may produce less than the entirety of the second image. In some examples, GPU 18 may process the graphics data to produce a portion of the second image.

GPU 18 may generate a data integrity check value associated with the portion of the second image, or may generate a plurality of data integrity check values associated with the plurality of portions of the second image (208). For example, the plurality of data integrity check values associated with the plurality of portions of the second image may include a third data integrity check value associated with the third portion and a fourth data integrity check value associated with the fourth portion.

GPU 18 may determine whether the portion of the second image matches the corresponding one of the plurality of portions of the second image by comparing the data integrity check value associated with the portion of the second image with the corresponding one of the plurality of data integrity check values associated with the plurality of portions of the first image (210). If GPU 18 generates a plurality of data integrity check values associated with the plurality of portions of the second image, GPU 18 may determine whether each of the plurality of portions of the second image matches a corresponding one of the plurality of portions of the first image by comparing each one of the plurality of data integrity check values associated with the plurality of portions of the second image with a corresponding one of the plurality of data integrity check values associated with the plurality of portions of the first image, including comparing the third data integrity check value with the first data integrity check value and the fourth data integrity check value with the second data integrity check value.

GPU 18 may determine whether an operational fault has occurred in the GPU subsystem 40 based at least in part the determination of whether the portion of the second image matches the corresponding one of the plurality of portions of the first image (212). If GPU 18 produces a plurality of portions of the second image, GPU 18 may determine whether an operational fault has occurred in the GPU subsystem 40 based at least in part the determination of whether each of the plurality of portions of the second image matches the corresponding one of the plurality of portions of the first image.

In some examples, if GPU 18 determines that an operational fault has not occurred in the GPU subsystem 40 based in part on the determination of whether the portion of the second image matches the corresponding one of the plurality of portions of the first image, GPU 18 may process the graphics data to produce a second portion of the second image, wherein the portion of the second image is a first portion of the second image, generate a second data integrity check value associated with the second portion of the second image, wherein the data integrity check value associated with the portion of the second image is a first data integrity check value associated with the first portion of the second image, determine whether the second portion of the second image matches the corresponding one of the plurality of portions of the first image by comparing the second data integrity check value associated with the second portion of the second image with the corresponding one of the plurality of data integrity check values associated with the plurality of portions of the first image, and determine whether the operational fault has occurred in the GPU subsystem based at least in part on the determination of whether the second portion of the second image matches the corresponding one of the plurality of portions of the first image.

In some examples, determining whether the operational fault has occurred in the GPU subsystem further includes determining that the operational fault has occurred in the GPU subsystem 40 when the number of data integrity values of the plurality of data integrity values associated with the plurality of portions of the second image that do not match corresponding data integrity values of the plurality of data integrity values associated with the plurality of portions of the first image exceeds a threshold.

In some examples, processing the graphics data to produce the plurality of portions of the first image further includes storing the first image into a frame buffer 36, and generating the plurality of data integrity check values associated with the plurality of portions of the first image further includes storing the plurality of data integrity values associated with the plurality of portions of the first image into a data integrity check value buffer 38 in memory 30.

In some examples, generating the plurality of data integrity check values associated with the plurality of portions of the second image and comparing the plurality of data integrity check values associated with the plurality of portions of the first image with the plurality of data integrity check values associated with the plurality of portions of the second image further includes, for each one of the plurality of portions of the second image: rendering the one of the plurality of portions of the second image to graphics memory 20, determine a data integrity value associated with the one of the plurality of portions of the second image, retrieving, from a data integrity check value buffer 38 in memory 30, a corresponding data integrity value associated with a corresponding one of the plurality of portions of the first image, comparing the data integrity value associated with the one of the plurality of portions of the second image with the corresponding data integrity value associated with the corresponding one of the plurality of portions of the first image, storing the one of the plurality of portions of the second image into the frame buffer 36 when the data integrity value associated with the one of the plurality of portions of the second image does not match the corresponding data integrity value associated with the corresponding one of the plurality of portions of the first image, and refraining from storing the one of the plurality of portions of the second image into the frame buffer 36 when the data integrity value associated with the one of the plurality of portions of the second image matches the corresponding data integrity value associated with the corresponding one of the plurality of portions of the first image.

In some examples, the plurality of portions of the first image comprises a first plurality of tiles produced by the GPU 18 while operating in a tile-based rendering mode, the plurality of data integrity check values associated with the plurality of portions of the first image are associated with the first plurality of tiles, the plurality of portions of the second image comprises a second plurality of tiles produced by the GPU 18 while operating in the tile-based rendering mode, and the plurality of data integrity check values associated with the plurality of portions of the second image are associated with the second plurality of tiles.

In some examples, the GPU 18 processes the graphics data to produce the plurality of portions of the first image in response to receiving, from a GPU driver 54, a first set of one or more commands to process the graphics data, the GPU 18 processes the graphics data to produce the plurality of portions of the second image in response to receiving, from the GPU driver 54, a second set of one or more commands to process the graphics data, and the GPU driver 54 is configured to send the first set of one or more commands and the second set of one or more commands to the GPU 18 in response to a single invocation of the GPU driver 54 by a software application 48 to direct GPU 18 to render an image.

In some examples, each of the plurality of data integrity check values associated with the plurality of portions of the first image and the plurality of data integrity check values associated with the plurality of portions of the second image is one of a cyclic redundancy check (CRC) code, a hash function, a checksum, or a multiple independent signature register (MISR) signature. In some examples, computing device 10 generates an interrupt in response to determining that the operational fault has occurred in the GPU subsystem 40. In some examples, computing device 10 generates one or more of an auditory, visual, or haptic warning in response to generating the interrupt. In some examples, GPU subsystem 40 is part of an advanced driver assistance system (ADAS) of a vehicle.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method for testing of a graphics processing unit (GPU) subsystem of a computing device, the method comprising:
    processing, by a GPU, graphics data to produce a first plurality of portions of a first image;
    generating, by the GPU, a first plurality of data integrity check values associated with the first plurality of portions of the first image, wherein each one of the first plurality of data integrity check values is associated with a corresponding portion of the first image;
    processing, by the GPU, the graphics data to produce a second plurality of portions of a second image, wherein processing the graphics data to produce the second plurality of portions of the second image includes producing fewer portions than every portion of the second image;
    generating, by the GPU, a second plurality of data integrity check values associated with the second plurality of portions of the second image;
    determining, by the GPU, whether each of the second plurality of portions of the second image matches a corresponding one of the first plurality of portions of the first image by comparing the second data integrity check values associated with the second plurality of portions of the second image with a corresponding one of the first plurality of data integrity check values associated with the first plurality of portions of the first image; and
    determining, by the GPU, whether an operational fault has occurred in the GPU subsystem based at least in part on the determination of whether a number of second data integrity check values of the second plurality of portions of the second image that do not match the corresponding first data integrity check values of the first plurality of portions of the first image exceeds a threshold.

2. The method of claim 1, wherein:
    processing the graphics data to produce the first plurality of portions of the first image further includes storing the first image into a frame buffer; and
    generating the first plurality of data integrity check values associated with the first plurality of portions of the first image further includes storing the first plurality of data integrity check values associated with the first plurality of portions of the first image into a data integrity check value buffer in memory.

3. The method of claim 2, wherein processing the graphics data to produce the second plurality of portions of the second image, generating the second plurality of data integrity check values associated with the second plurality of portions of the second image and determining whether each of the second plurality of portions of the second image matches the corresponding one of the first plurality of portions of the first image further comprises:
    for each one of the second plurality of portions of the second image:
        rendering, by the GPU, the one of the second plurality of portions of the second image to graphics memory;
        determining, by the GPU, a data integrity check value associated with the one of the second plurality of portions of the second image;
        retrieving, by the GPU from the data integrity check value buffer in memory, a corresponding data integrity check value associated with the corresponding one of the first plurality of portions of the first image;
        comparing, by the GPU, the data integrity check value associated with the one of the second plurality of portions of the second image with the corresponding data integrity check value associated with the corresponding one of the first plurality of portions of the first image;
        storing, by the GPU, the one of the second plurality of portions of the second image into the frame buffer in the memory when the data integrity check value associated with the one of the second plurality of portions of the second image does not match the corresponding data integrity check value associated with the corresponding one of the first plurality of portions of the first image; and
        refraining, by the GPU, from storing the one of the second plurality of portions of the second image into the frame buffer in the memory when the data integrity check value associated with the one of the second plurality of portions of the second image matches the corresponding data integrity check value associated with the corresponding one of the first plurality of portions of the first image.

4. The method of claim 1, wherein:
    the first plurality of portions of the first image comprises a first plurality of tiles produced by the GPU while operating in a tile-based rendering mode;
    the first plurality of data integrity check values associated with the first plurality of portions of the first image is associated with the first plurality of tiles;
    the second plurality of portions of the second image comprises a second plurality of tiles produced by the GPU while operating in the tile-based rendering mode; and
    the second plurality of data integrity check values associated with the plurality of portions of the second image are associated with the second plurality of tiles.

5. The method of claim 1, wherein:
the GPU processes the graphics data to produce the first plurality of portions of the first image in response to receiving, from a GPU driver, a first set of one or more commands to process the graphics data;
the GPU processes the graphics data to produce the second plurality of portions of the second image in response to receiving, from the GPU driver, a second set of one or more commands to process the graphics data; and
the GPU driver is configured to send the first set of one or more commands and the second set of one or more commands to the GPU in response to a single invocation of the GPU driver by a software application to direct the GPU to render an image.

6. The method of claim 1, wherein each of the first plurality of data integrity check values associated with the first plurality of portions of the first image and the second plurality of data integrity check values associated with the second plurality of portions of the second image is one of a cyclic redundancy check (CRC) code, a hash function, a checksum, or a multiple independent signature register (MISR) signature.

7. The method of claim 1, further comprising:
generating, by the computing device, an interrupt in response to determining that the operational fault has occurred in the GPU subsystem.

8. The method of claim 7, further comprising:
generating, by the computing device, one or more of an auditory, visual, or haptic warning in response to generating the interrupt.

9. The method of claim 1, wherein the GPU subsystem is part of an advanced driver assistance system (ADAS) of a vehicle.

10. An apparatus configured for graphics processing, the apparatus comprising:
one or more memories; and
a graphics processing unit (GPU) in communication with the one or memories via one or more buses, wherein a GPU subsystem comprises the one or more memories, the GPU, and the one or more buses, the GPU being configured to:
process graphics data to produce a first plurality of portions of a first image;
generate a first plurality of data integrity check values associated with the first plurality of portions of the first image, wherein each one of the first plurality of data integrity check values is associated with a corresponding portion of the first image;
process the graphics data to produce a second plurality of portions of a second image, wherein processing the graphics data to produce the second plurality of portions of the second image includes producing fewer portions than every portion of the second image;
generate a second plurality of data integrity check values associated with the second plurality of portions of the second image;
determine whether each of the second plurality of portions of the second image matches a corresponding one of the first plurality of portions of the first image by comparing the second data integrity check values associated with the second plurality of portions of the second image with a corresponding one of the first plurality of data integrity check values associated with the first plurality of portions of the first image; and
determine whether an operational fault has occurred in the GPU subsystem based at least in part on the determination of whether a number of second data integrity check values of the second plurality of portions of the second image that do not match the corresponding first data integrity check values of the first plurality of portions of the first image exceeds a threshold.

11. The apparatus of claim 10, wherein the GPU is further configured to:
store the first image into a frame buffer in the one or more memories; and
store the first plurality of data integrity check values associated with the first plurality of portions of the first image into a data integrity check value buffer in the one or more memories.

12. The apparatus of claim 11, wherein the GPU is further configured to:
for each one of the second plurality of portions of the second image:
render the one of the second plurality of portions of the second image to graphics memory;
determine a data integrity check value associated with the one of the second plurality of portions of the second image;
retrieve, from the data integrity check value buffer in the one or more memories, a corresponding data integrity check value associated with a corresponding one of the first plurality of portions of the first image;
compare the data integrity check value associated with the one of the second plurality of portions of the second image with the corresponding data integrity check value associated with the corresponding one of the first plurality of portions of the first image;
store the one of the second plurality of portions of the second image into the frame buffer in the one or more memories when the data integrity check value associated with the one of the second plurality of portions of the second image does not match the corresponding data integrity check value associated with the corresponding one of the first plurality of portions of the first image; and
refrain from storing the one of the second plurality of portions of the second image into the frame buffer in the one or more memories when the data integrity check value associated with the one of the second plurality of portions of the second image matches the corresponding data integrity check value associated with the corresponding one of the first plurality of portions of the first image.

13. The apparatus of claim 10, wherein:
the first plurality of portions of the first image comprises a first plurality of tiles produced by the GPU while operating in a tile-based rendering mode;
the first plurality of data integrity check values associated with the first plurality of portions of the first image is associated with the first plurality of tiles;
the second plurality of portions of the second image comprises a second plurality of tiles produced by the GPU while operating in the tile-based rendering mode; and
the second plurality of data integrity check values associated with the plurality of portions of the second image are associated with the second plurality of tiles.

14. The apparatus of claim 10, wherein:
the GPU processes the graphics data to produce the first plurality of portions of the first image in response to receiving, from a GPU driver, a first set of one or more commands to process the graphics data;

the GPU processes the graphics data to produce the second plurality of portions of the second image in response to receiving, from the GPU driver, a second set of one or more commands to process the graphics data; and the GPU driver is configured to send the first set of one or more commands and the second set of one or more commands to the GPU in response to a single invocation of the GPU driver by a software application to direct the GPU to render an image.

15. The apparatus of claim 10, wherein each of the first plurality of data integrity check values associated with the first plurality of portions of the first image and the second plurality of data integrity check values associated with the second plurality of portions of the second image is one of a cyclic redundancy check (CRC) code, a hash function, a checksum, or a multiple independent signature register (MISR) signature.

16. The apparatus of claim 10, wherein the GPU is further configured to:
generate an interrupt in response to determining that the operational fault has occurred in the GPU subsystem.

17. The apparatus of claim 16, wherein the GPU is further configured to:
generate one or more of an auditory, visual, or haptic warning in response to generating the interrupt.

18. The apparatus of claim 10, wherein the GPU subsystem is part of an advanced driver assistance system (ADAS) of a vehicle.

19. An apparatus configured for graphics processing, the apparatus comprising:
means for processing graphics data to produce a first plurality of portions of a first image;
means for generating a first plurality of data integrity check values associated with the first plurality of portions of the first image, wherein each one of the first plurality of data integrity check values is associated with a corresponding portion of the first image;
means for processing the graphics data to produce a second plurality of portions of a second image, wherein processing the graphics data to produce the second plurality of portions of the second image includes producing fewer portions than every portion of the second image;
means for generating a second plurality of data integrity check values associated with the second plurality of portions of the second image;
means for determining whether each of the second plurality of portions of the second image matches a corresponding one of the first plurality of portions of the first image by comparing the second data integrity check values associated with the second plurality of portions of the second image with a corresponding one of the first plurality of data integrity check values associated with the first plurality of portions of the first image; and
means for determining whether an operational fault has occurred in the GPU subsystem based at least in part on the determination of whether a number of second data integrity check values of the second plurality of portions of the second image that do not match the corresponding first data integrity check values of the first plurality of portions of the first image exceeds a threshold.

20. The apparatus of claim 19, wherein the means for processing the graphics data to produce the second plurality of portions of the second image, the means for generating the second plurality of data integrity check values associated with the second plurality of portions of the second image, and the means for determining whether each of the second plurality of portions of the second image matches the corresponding one of the first plurality of portions of the first image further comprises:
means for, for each one of the plurality of portions of the second image:
rendering the one of the second plurality of portions of the second image to graphics memory;
determining a data integrity check value associated with the one of the second plurality of portions of the second image;
retrieving, from the data integrity check value buffer, a corresponding data integrity check value associated with the corresponding one of the first plurality of portions of the first image;
comparing the data integrity check value associated with the one of the second plurality of portions of the second image with the corresponding data integrity check value associated with the corresponding one of the first plurality of portions of the first image;
storing the one of the second plurality of portions of the second image into the frame buffer in the memory when the data integrity check value associated with the one of the second plurality of portions of the second image does not match the corresponding data integrity check value associated with the corresponding one of the first plurality of portions of the first image; and
refraining from storing the one of the second plurality of portions of the second image into the frame buffer in the memory when the data integrity check value associated with the one of the second plurality of portions of the second image matches the corresponding data integrity check value associated with the corresponding one of the first plurality of portions of the first image.

21. A computer-readable storage medium storing instructions that, when executed, cause one or more processors to:
process graphics data to produce a first plurality of portions of a first image;
generate a first plurality of data integrity check values associated with the first plurality of portions of the first image, wherein each one of the first plurality of data integrity check values is associated with a corresponding portion of the first image;
process the graphics data to produce a second plurality of portions of a second image, wherein processing the graphics data to produce the second plurality of portions of the second image includes producing fewer portions than every portion of the second image;
generate a second plurality of data integrity check values associated with the second plurality of portions of the second image;
determine whether each of the second plurality of portions of the second image matches a corresponding one of the first plurality of portions of the first image by comparing the second data integrity check values associated with the second plurality of portions of the second image with a corresponding one of the first plurality of data integrity check values associated with the first plurality of portions of the first image; and
determine whether an operational fault has occurred in the GPU subsystem based at least in part on the determination of whether a number of second data integrity check values of the second plurality of portions of the second image that do not match the corresponding first data integrity check values of the first plurality of portions of the first image exceeds a threshold.

22. The computer-readable storage medium of claim 21, wherein the instructions that, when executed, cause the one or more processors to process the graphics data to produce the second plurality of portions of the second image, generate the second plurality of data integrity check values associated with the second plurality of portions of the second image, and determine whether each of the second plurality of portions of the second image matches the corresponding one of the first plurality of portions of the first image, further cause the one or more processors to:

for each one of the plurality of portions of the second image:
render the one of the second plurality of portions of the second image to graphics memory;
determine a data integrity check value associated with the one of the second plurality of portions of the second image;
retrieve, from a data integrity check value buffer in memory, a corresponding data integrity check value associated with a corresponding one of the first plurality of portions of the first image;
compare the data integrity check value associated with the one of the second plurality of portions of the second image with the corresponding data integrity check value associated with the corresponding one of the first plurality of portions of the first image;
store the one of the second plurality of portions of the second image into the frame buffer in the memory when the data integrity check value associated with the one of the second plurality of portions of the second image does not match the corresponding data integrity check value associated with the corresponding one of the first plurality of portions of the first image; and
refrain from storing the one of the second plurality of portions of the second image into the frame buffer in the memory when the data integrity check value associated with the one of the second plurality of portions of the second image matches the corresponding data integrity check value associated with the corresponding one of the first plurality of portions of the first image.

* * * * *